United States Patent

Haluska et al.

[11] Patent Number: 5,445,894
[45] Date of Patent: Aug. 29, 1995

[54] CERAMIC COATINGS

[75] Inventors: Loren A. Haluska; Keith W. Michael, both of Midland County, Mich.

[73] Assignee: Dow Corning Corporation, Midland, Mich.

[21] Appl. No.: 688,233

[22] Filed: Apr. 22, 1991

[51] Int. Cl.$^6$ .................. B22F 7/08; C08K 5/07
[52] U.S. Cl. .................. 428/557; 428/266; 427/219; 524/284
[58] Field of Search ............... 428/698, 697, 557, 266; 427/53.1, 407.1, 219; 524/284

[56] References Cited

U.S. PATENT DOCUMENTS

| | | | |
|---|---|---|---|
| 4,756,977 | 7/1988 | Haluska et al. | 428/704 |
| 4,973,526 | 11/1990 | Haluska | 428/697 |
| 5,008,204 | 4/1991 | Haluska et al. | 524/361 |
| 5,059,448 | 10/1991 | Chandra et al. | 427/53.1 |
| 5,063,267 | 11/1991 | Hanneman et al. | 524/284 |
| 5,091,162 | 2/1992 | Frye et al. | 423/325 |
| 5,116,637 | 5/1992 | Baney et al. | 427/340 |
| 5,118,530 | 6/1992 | Hanneman et al. | 427/226 |
| 5,145,723 | 8/1992 | Ballance et al. | 427/397.7 |

Primary Examiner—Peter A. Nelson
Attorney, Agent, or Firm—Roger E. Gobrogge

[57] ABSTRACT

The present invention relates to the application of ceramic coatings on substrates. The method comprises applying a preceramic coating comprising hydrogen silsesquioxane resin, a material containing Si—Si bonds which forms volatile SiH compounds, and a catalyst followed by pyrolyzing the preceramic coating in an inert atmosphere. The novel ceramic coatings formed by the process of this invention are especially valuable on electronic devices.

20 Claims, No Drawings

CERAMIC COATINGS

BACKGROUND OF THE INVENTION

The present invention relates to the application of ceramic coatings on substrates. The method comprises applying a preceramic coating comprising hydrogen silsesquioxane resin, a material containing Si—Si bonds which forms volatile SiH compounds, and a catalyst followed by pyrolyzing the preceramic coating in an inert atmosphere. The novel ceramic coatings formed by the process of this invention are especially valuable on electronic devices.

The use of ceramic coatings on various substrates, including electronic devices, is known in the art. For instance, Haluska et al. in U.S. Pat. No. 4,756,977, which is incorporated herein in its entirety by reference, disclose ceramic coatings produced by applying solutions of hydrogen silsesquioxane resin to a substrate and then ceramifying by heating to temperatures of 200°–1000° C. It is taught therein that the resultant ceramic coatings have many desirable characteristics which make them valuable as protective and insulating layers on electronic devices.

Haluska in European Publication No. 0427395 published May 15, 1991, also describes a process for applying ceramic coatings on substrates comprising forming a hydrogen silsesquioxane resin preceramic coating on a substrate and then pyrolyzing it in an inert atmosphere at temperatures of 500°–1000° C. This process is described therein as being valuable for the application of ceramic coatings on substrates prone to oxidation.

The present inventors have now unexpectedly found that a material containing Si—Si bonds which forms volatile SiH compounds and a platinum or copper catalyst can assist in the conversion of hydrogen silsesquioxane resin to novel ceramic coatings.

SUMMARY OF THE INVENTION

The present invention relates to a method of forming a ceramic coating on a substrate and the substrates coated thereby. The method comprises depositing a preceramic coating comprising hydrogen silsesquioxane resin, a material containing Si—Si bonds which forms volatile SiH compounds, and a Pt or Cu catalyst on the substrate. The preceramic coating is then pyrolyzed in an inert atmosphere at a temperature in the range of about 200° C. up to about 1000° C.

The present invention also relates to a composition comprising a solvent, hydrogen silsesquioxane resin, a material containing Si—Si bonds which forms volatile SiH compounds, and a Pt or Cu catalyst.

DETAILED DESCRIPTION OF THE INVENTION

The present invention is based on the discovery that a mixture of hydrogen silsesquioxane resin (H-resin), a material containing Si—Si bonds which forms volatile SiH compounds, and a platinum or copper catalyst (catalyst) can be used to form novel ceramic coatings on various substrates. The material containing Si—Si bonds which forms volatile SiH compounds and catalyst herein unexpectedly promote the ceramification of the H-resin by catalyzing cleavage of SiH bonds. Additionally, the resultant coatings are particularly unique and advantageous in that they contain both Si—O and Si—Si bonds, thereby adding to the coatings flexibility.

The coatings taught herein are useful for many purposes such as protection and insulation. For instance, these coatings may be used in conventional applications for corrosion and abrasion resistant materials. In addition, however, these coatings possess properties which make them ideally suited for use on electric devices. For instance, the planarizing and dielectric properties of these coatings make them ideally suited as interlevel dielectrics in multilayered devices. Similarly, the high density and low defect rate of these coatings makes them useful for protecting devices from environments such as moisture and ionic impurities.

Despite the specific applications set forth above, however, it is contemplated that the coatings taught herein can be used on any substrate requiring such a coating. Moreover, the choice of such substrates and devices is limited only by the need for thermal and chemical stability of the substrate at the temperature and atmosphere utilized in the present invention.

As used in the present invention, the expression "ceramic" refers to those pyrolyzed materials containing Si—O and Si—Si bonds which may or may not be fully free of residual carbon and/or hydrogen but which are otherwise ceramic in character; the expression "planarizing coating" refers to a coating which provides a surface barrier layer that is less irregular than the surface prior to application of the coating; and the expressions "electronic device" or "electronic circuit" include, but are not limited to silicon based devices, gallium arsenide based devices, focal plane arrays, optoelectronic devices, photovoltaic cells and optical devices. Specific examples of such devices include transistor-like devices, capacitor and capacitor-like devices, multilayer devices, 3-D devices, silicon on insulator devices, super lattice devices and the like.

The ceramic coatings taught herein are produced by a process which comprises applying a preceramic coating comprising H-resin, a material containing Si—Si bonds which forms volatile SiH compounds, and a catalyst and then heating the preceramic coating in an inert atmosphere at a temperature in the range of between about 200° and about 1000° C. In a preferred embodiment of this invention the preceramic coating is applied by a process which comprises coating the substrate with a solution comprising a solvent, H-resin, a material containing Si—Si bonds which forms volatile SiH compounds, and a catalyst and then evaporating the solvent.

Hydrogen silsesquioxane resin is used in this application to describe various hydridosilane resins (resins which have a hydrogen atom attached to the silicon atom). Such resins are generally produced by the hydrolysis and condensation of silanes of the formula $HSiX_3$, wherein X is a hydrolyzable group. These resins may be fully condensed $(HSiO_{3/2})_n$ or the hydrolysis may be interrupted at an intermediate point such that partial hydrolyzates and/or partial condensates are formed. The latter resins, therefore, often contain residual SiOR and/or SiOH moieties. Though not represented by this structure, these resins may contain less than the stoichiometric number of Si—H bonds due to various factors involved in their formation or handling.

Nearly fully condensed H-resin may be formed by the process of Collins et al. in U.S. Pat. No. 3,615,272, which is incorporated herein by reference. This material has units of the formula $(HSiO_{3/2})_n$ in which n is generally 8–1000. The resin has a number average molecular weight of from about 800–2900 and a weight average molecular weight of between about 8000–28,000. The Collins et al. patent teaches that such resins may be formed by a process comprising hydrolyzing trichlorosilane in a benzenesulfonic acid hydrate hydrolysis medium and then washing the resultant resin with water or aqueous sulfuric acid. It is noted that the reference describes this material as fully condensed. Recent analysis, however, has confirmed that up to 100–300 ppm silanol may be present.

H-resins which are not fully condensed (polymers containing units of the formula $HSi(OH)_aO_{(3-a)/2}$, wherein $a=0-2$) may be produced by the process of Bank et al. in U.S. Pat. No. 5,010,159, or that of Frye et al. in U.S. Pat. No. 4,999,397, both of which are hereby incorporated by reference. The process described by Bank et al. comprises hydrolyzing hydridosilanes in an arylsulfonic acid hydrate hydrolysis medium to form a resin which is then contacted with a neutralizing agent. Recent experimentation has shown that an especially preferred H-resin which forms substantially crack-free coatings may be prepared by this method in which the acid/silane ratio is greater than about 2.67:1, preferably about 6/1.

The process described in the Frye et al. application comprises hydrolyzing trichlorosilane in a non-sulfur containing polar organic solvent by the addition of water or HCl and a metal oxide. The metal oxide therein acts as a HCl scavenger and also serves as a continuous source of water.

H-resins which are not be fully hydrolyzed or condensed (polymers having units of the formula $HSi(OH)_x(OR)_yO_{z/2}$, in which each R is independently an organic group which, when bonded to silicon through the oxygen atom, forms a hydrolyzable substituent, $x=0-2$, $y=0-2$, $z=1-3$, $x+y+z=3$ and the average value of y over all of the units of the polymer is greater than 0) can be made by a process which comprises hydrolyzing a hydrocarbonoxy hydridosilane with water in an acidified oxygen-containing polar organic solvent.

The material containing Si—Si bonds can be any which forms volatile SiH compounds. Specifically, the material should be one which will react with H-resin, strip off the hydrogens from the silicon and volatilize out of the system. These materials are known in the art and can include, for example, dodecamethyl cyclohexasilane, methyltris(trimethylsilyl)silane, decamethyl cyclopentasilane, and tris(trimethylsilyl)phenylsilane. In a preferred embodiment of the invention, the material comprises dodecamethyl cyclohexasilane $((CH_3)_2Si)_6$. This agent can be made by any conventional technique such as the reaction of dimethyldichlorosilane with lithium as described by West et al., Synthesis, Communications, pp. 684–6 (1985), which is incorporated herein by reference.

The amount of a material containing Si—Si bonds which forms volatile SiH compounds used herein is not critical and can vary over a wide range. Generally, however, enough should be included to assist in ceramification of the H-resin. If dodecamethyl cyclohexasilane is used, the stoichiometric amount would be about 1 mole cyclohexasilane per 12 moles Si—H units. Though stoichiometric excess is often preferred, substoichiometric amounts (eg., 1 mole cyclohexasilane per 25 moles Si—H units) would assist in partial removal of the Si—H groups.

A platinum or copper catalyst is also included in the preceramic coating to increase the rate and extent of SiH removal. Generally, any platinum or copper compound or complex which can be evenly distributed in the preceramic mixture will be functional. For instance, an organoplatinum composition such as platinum acetylacetonate or a copper compound such as cupric naphthenate are within the scope of this invention. Such catalysts are well known in the art and commercially available. These catalysts are generally used herein in an amount of between about 10 and about 1000 ppm platinum or copper based on the weight of H-resin.

The above H-resin, a material containing Si—Si bonds which forms volatile SiH compounds, and catalyst are then deposited on the surface of the substrate. This can be accomplished in any manner, but a preferred method involves dissolving the ingredients in a solvent to form a solution which is applied to the surface of the substrate. Various facilitating measures such as stirring and/or heating may be used to aid in dissolution. Solvents which may be used include any agent or mixture of agents which will dissolve the ingredients to form a homogenous solution without affecting the ceramic coating. These solvents can include, for example, aromatic hydrocarbons such as benzene or toluene, alkanes such as n-heptane or dodecane, ketones, esters, glycol ethers, or cyclic dimethylpolysiloxanes, in an amount sufficient to dissolve the above materials to low solids. Generally, enough of the above solvent is used to form a 0.1–50 weight percent solution.

If a solution method is used, the solution comprising the H-resin, solvent, a material containing Si—Si bonds which forms volatile SiH compounds, and catalyst is coated onto the substrate. The method of coating can be, but is not limited to, spin coating, dip coating, spray coating or flow coating. Other equivalent means, however, are also deemed to be within the scope of this invention.

The solvent in the solution method is then allowed to evaporate resulting in the deposition of a preceramic coating. Any suitable means of evaporation may be used. Methods such as simple air drying by exposure to an ambient environment or by the application of a vacuum or mild heat are functional herein. It is to be noted that when spin coating is used, an additional drying period may not be necessary as the spinning often drives off the solvent.

Once the preceramic coating is applied, it is then ceramified by subjecting it to a sufficient temperature in the presence of an inert environment. Generally, the temperatures useful herein are in the range of about 300° C. to about 1000° C. Higher and lower temperatures, however, are also contemplated. For instance, temperatures as low as about 200° C. may cure the preceramic coating. The density of such ceramics, however, is often too low to provide the necessary protective or dielectric effects. Similarly, higher temperatures may also be used in this process, but temperatures above about 1000° C. add little benefit to the preceramic coating.

In a preferred embodiment of this invention, UV light is added to the pyrolysis environment to lower the pyrolysis temperatures necessary for ceramification. Under such conditions, temperatures in the range of greater than about 150° C. are functional herein.

Generally, the coated substrates are exposed to the inert atmosphere at the desired temperature for a time sufficient for ceramification. Time periods in the range of a few minutes for very thin films (eg., less than about 0.1 micron) to several hours for thicker films, depending on the temperature, are generally useful herein. It is particularly preferred to heat the coated substrates at a temperature of about 400° C. for about 3 hours.

Any inert gas atmosphere such as argon or helium may be used in the above ceramification step. Exclusion of oxygen is, however, generally necessary to produce the novel coating of this invention since heating the coating in the presence of oxygen will result in its conversion to silica ($SiO_2$).

Any method of heating such as the use of a convection oven or radiant or microwave energy is generally functional herein. Similarly, the rate of heating is generally not a critical factor, but it is most practical and preferred to heat the substrate as rapidly as possible.

In a typical ceramification procedure, the coated substrate may be placed in a convection oven and a continuous flow of inert gas introduced therein. The temperature in the oven is then raised to the desired level (such as about 400° C.) and maintained for the desired time (such as about 3 hours).

Though the inventors do not wish to be limited by the theory, it is proposed that the material containing Si—Si bonds which forms volatile SiH compounds and catalyst create a reactive environment which assists in cleavage of SiH bonds and ceramification of the coating. When dodecamethyl cyclohexasilane is used, it is proposed that dimethylsilane (($CH_3)_2SiH_2$) is released by this cleavage with the resultant coating comprising an amorphous silicon suboxide.

By the above methods a thin (less than 2 microns) ceramic planarizing coating is produced on the substrate. The coating smooths the irregular surfaces of various substrates and has excellent adhesive properties. In addition, the coating may be covered by other coatings such as additional $SiO_2$ layers, silicon containing coatings, silicon carbon containing coatings, silicon nitrogen containing coatings, silicon oxygen nitrogen containing coatings and/or silicon nitrogen carbon containing coatings. Such multiple layer coatings are known in the art and many are described in U.S. Pat. No. 4,756,977 which is hereby incorporated by reference.

The following non-limiting example is included so that one skilled in the art may more readily understand the invention.

Infrared analyses were run on the silicon wafers (IR transparent) coated in the following example. The conversion to ceramic material is indicated by the removal of the SiH group as evidenced by the disappearance of the IR peak at about 2245 $cm^{-1}$. The percent SiH remaining after hydrolysis was calculated by comparing the area of the SiH peak before and after hydrolysis. Refractive index was measured at the wavelength specified in the table. Thickness was determined by the Rudolph Elipsometer.

EXAMPLE 1

Hydrogen silsesquioxane resin made by the method of Bank et al., dodecamethyl cyclohexasilane, and a catalyst (in the amounts specified in Table 1) were dissolved in toluene by stirring in a flask at room temperature to form a clear, non-gelled solution.

1 inch square silicon wafers were coated with these solutions and then spun at 3000 rpm for 35 seconds. The devices were heated in a 2 inch Lindberg Furnace with a nitrogen atmosphere at the temperature and for the time indicated in Table. When used, the UV light was generated by a 450 watt Canrad-Hanovia medium pressure photochemical lamp in a UV reactor. FTIR spectra were taken before and after pyrolysis and the results were compared to determine the amount of SiH reacted.

Examples 1–6 show the effect of varying the amount of catalyst in solution. Note that increasing the amount of catalyst increases the amount of SiH conversion. Examples 7 and 8 show that increasing the amount of cyclohexasilane and catalyst increases the SiH conversion. Examples 9–11 are comparative and show that removing the cyclohexasilane (9) and the cyclohexasilane and catalyst (11) decreases the SiH conversion. Examples 12–13 show that removing the catalyst decreases the SiH conversion. Examples 14–17 show that lowering the temperature decreases the SiH conversion. Examples 18–21 show that adding UV light to the pyrolysis environment increases the SiH conversion.

TABLE 1

| Ex. | Preceramic Mixture | Pyrolysis | Results |
|---|---|---|---|
| 1 | 10 wt % H-resin<br>11 wt % cyclohexasilane<br>120 ppm Pt Acetylacetonate<br>in toluene | 400° C. for 2 hours | FTIR-no silanol<br>-49.7% SiH reacted<br>Thickness-1871 angstrom<br>RI-1.431 (8300 lambda) |
| 2 | 10 wt % H-resin<br>11 wt % cyclohexasilane<br>120 ppm Cupric Naphthenate<br>in toluene | 400° C. for 2 hours | FTIR-no silanol<br>-63% SiH reacted<br>Thickness-2522 angstrom<br>RI-1.376 (8300 lambda) |
| 3 | 10 wt % H-resin<br>11 wt % cyclohexasilane<br>240 ppm Pt Acetylacetonate<br>in toluene | 400° C. for 3 hours | FTIR-no silanol<br>-70.7% SiH reacted<br>Thickness-2489 angstrom<br>RI-1.374 (6328 lambda) |
| 4 | 10 wt % H-resin<br>11 wt % cyclohexasilane<br>240 ppm Cupric Naphthenate<br>in toluene | 400° C. for 3 hours | FTIR-no silanol<br>-75.5% SiH reacted<br>Thickness-1985 angstrom<br>RI-1366 (8300 lambda) |
| 5 | 10 wt % H-resin<br>11 wt % cyclohexasilane<br>360 ppm Pt Acetylacetonate<br>in toluene | 400° C. for 3 hours | FTIR-no silanol<br>-72.5% SiH reacted<br>Thickness-2481 angstrom<br>RI-1.389 (8300 lambda) |
| 6 | 10 wt % H-resin<br>11 wt % cyclohexasilane<br>360 ppm Cupric Naphthenate<br>in toluene | 400° C. for 3 hours | FTIR-no silanol<br>-81.1% SiH reacted<br>Thickness-2098 angstrom<br>RI-1.394 (8300 lambda) |
| 7 | 10 wt % H-resin<br>16.6 wt % cyclohexasilane<br>740 ppm Pt Acetylacetonate | 400° C. for 3 hours | FTIR-<br>-83.3% SiH reacted<br>Thickness-4879 angstrom |

TABLE 1-continued

| Ex. | Preceramic Mixture | Pyrolysis | Results |
|---|---|---|---|
|  | in toluene |  | RI-1.401 (6328 lambda) |
| 8 | 10 wt % H-resin<br>16.6 wt % cyclohexasilane<br>740 ppm Cupric Naphthenate<br>in toluene | 400° C. for 3 hours | FTIR-<br>-84.4% SiH reacted<br>Thickness-4016 angstrom<br>RI-1.539 (6328 lambda) |
| 9 | 10 wt % H-resin<br>120 ppm Pt Acetylacetonate<br>in toluene | 400° C. for 3 hours | FTIR<br>-43.7% SiH reacted<br>Thickness-4835 angstrom<br>RI-1.382 (6328 lambda) |
| 10 | 10 wt % H-resin<br>16.6 wt % cyclohexasilane<br>120 ppm Pt Acetylacetonate<br>in toluene | 400° C. for 3 hours | FTIR-<br>-55.9% SiH reacted<br>Thickness-5675 angstrom<br>RI-1.364 (6328 lambda) |
| 11 | 10 wt % H-resin<br><br>in toluene | 400° C. for 3 hours | FTIR-<br>-35.4% SiH reacted<br>Thickness-4908 angstrom<br>RI-1.384 (6328 lambda) |
| 12 | 10 wt % H-resin<br>16.7 wt % cyclohexasilane<br>in toluene | 400° C. for 3 hours | FTIR-<br>-41% SiH reacted<br>Thickness-6096 angstrom<br>RI-1.373 (8300 lambda) |
| 13 | 10 wt % H-resin<br>11 wt % cyclohexasilane<br>in toluene | 400° C. for 3 hours | FTIR-<br>-20% SiH reacted<br>Thickness-7093 angstrom<br>RI-1.260 (8300 lambda) |
| 14 | 10 wt % H-resin<br>16.5 wt % cyclohexasilane<br>740 ppm Pt Acetylacetonate<br>in toluene | 200° C. for 3 hours | FTIR-<br>Little reaction occurred |
| 15 | 10 wt % H-resin<br>16.5 wt % cyclohexasilane<br>740 ppm Cupric Naphthenate<br>in toluene | 200° C. for 3 hours | FTIR-<br>Little reaction occurred |
| 16 | 10 wt % H-resin<br>16.5 wt % cyclohexasilane<br>740 ppm Pt Acetylacetonate<br>in toluene | 300° C. for 3 hours | FTIR-<br>-23% SiH reacted<br>Thickness-6134 angstrom<br>RI-1.411 (8300 lambda) |
| 17 | 10 wt % H-resin<br>16.5 wt % cyclohexasilane<br>740 ppm Cupric Naphthenate<br>in toluene | 300° C. for 3 hours | FTIR-<br>-30% SiH reacted<br>Thickness-7079 angstrom<br>RI-1.350 (8300 lambda) |
| 18 | 10 wt % H-resin<br>13.9 wt % cyclohexasilane<br>740 ppm Pt Acetylacetonate<br>in toluene | 200° C. for 2 hours<br>with UV light | FTIR-<br>-78% SiH reacted<br>Thickness-6529 angstrom<br>RI-1.421 (6328 lambda) |
| 19 | 10 wt % H-resin<br>13.9 wt % cyclohexasilane<br>740 ppm Cupric Naphthenate<br>in toluene | 200° C. for 2 hours<br>with UV light | FTIR-<br>-79% SiH reacted<br>Thickness-5135 angstrom<br>RI-1.457 (6328 lambda) |
| 20 | 10 wt % H-resin<br>13.9 wt % cyclohexasilane<br>740 ppm Pt Acetylacetonate<br>in toluene | 235° C. for 3 hours<br>with UV light | FTIR-<br>-81% SiH reacted<br>Thickness-5004 angstrom |
| 21 | 10 wt % H-resin<br>13.9 wt % cyclohexasilane<br>740 ppm Cupric Naphthenate<br>in toluene | 235° C. for 3 hours<br>with UV light | FTIR-<br>-90% SiH reacted<br>Thickness-6240 angstrom<br>RI-1.479 (6328 lambda) |

That which is claimed is:

1. A method of forming a ceramic coating on a substrate comprising:
    depositing a preceramic coating comprising hydrogen silsesquioxane resin, a material containing Si—Si bonds which forms volatile SiH compounds, and a catalyst selected from the group consisting of platinum catalysts and copper catalysts; and
    pyrolyzing the preceramic coating in an inert atmosphere to a temperature sufficient for ceramification.

2. The method of claim 1 wherein the material containing Si—Si bonds comprises dodecamethyl cyclohexasilane.

3. The method of claim 2 wherein the preceramic coating is applied by a process which comprises coating the substrate with a solution comprising a solvent, hydrogen silsesquioxane resin, dodecamethyl cyclohexasilane, and a catalyst selected from the group consisting of platinum catalysts and copper catalysts and then evaporating the solvent.

4. The method of claim 3 wherein said solution contains between about 0.1 and about 50 weight percent solids of hydrogen silsesquioxane and dodecamethyl cyclohexasilane, the solvent is selected from the group consisting of aromatic hydrocarbons, alkanes, ketones, esters, cyclic dimethylpolysiloxanes and glycol ethers, and the ratio of dodecamethyl cyclohexasilane to hydrogen silsesquioxane resin is greater than about 1 mole cyclohexasilane per 25 moles Si—H units.

5. The method of claim 4 wherein the platinum or copper catalyst is present in an amount of between about 10 and about 1000 ppm of the metal based on the weight of hydrogen silsesquioxane.

6. The method of claim 2 wherein the coating is ceramified by heating to a temperature in the range of about 300° C. up to about 1000° C.

7. The method of claim 2 wherein the coating is ceramified by heating to a temperature in the range of about 200° C. up to about 1000° C. in the presence of UV light.

8. The method of claim 2 wherein the catalyst is selected from the group consisting of platinum acetylacetonate and cupric naphthenate.

9. The method of claim 1 wherein said substrate is an electronic device.

10. The method of claim 4 wherein said substrate is an electronic device.

11. A substrate coated by the method of claim 1.

12. A substrate coated by the method of claim 9.

13. A substrate coated by the method of claim 10.

14. A homogenous liquid composition comprising a solvent, hydrogen silsesquioxane resin, a material containing Si—Si bonds which forms volatile SiH compounds, and a catalyst selected from the group consisting of platinum catalysts and copper catalysts.

15. The composition of claim 14 wherein the material containing Si—Si bonds comprises dodecamethyl cyclohexasilane.

16. The composition of claim 15 wherein said liquid composition contains between about 0.1 and about 50 weight percent solids of hydrogen silsesquioxane and dodecamethyl cyclohexasilane.

17. The composition of claim 15 wherein the solvent is selected from the group consisting of aromatic hydrocarbons, alkanes, ketones, esters, cyclic dimethylpolysiloxanes and glycol ethers.

18. The composition of claim 15 wherein the ratio of dodecamethyl cyclohexasilane to hydrogen silsesquioxane resin is greater than about 1 mole cyclohexasilane per 25 moles Si—H units.

19. The composition of claim 15 wherein the platinum or copper catalyst is present in an amount of between about 10 and about 1000 ppm of the metal based on the weight of hydrogen silsesquioxane.

20. The composition of claim 15 wherein the catalyst is selected from the group consisting of platinum acetylacetonate and cupric naphthenate.

* * * * *